Sept. 17, 1968     P. F. GIRARD     3,401,906
GYROCHUTE

Filed May 3, 1966     2 Sheets-Sheet 1

INVENTOR.
PETER F. GIRARD
BY
Knox & Knox

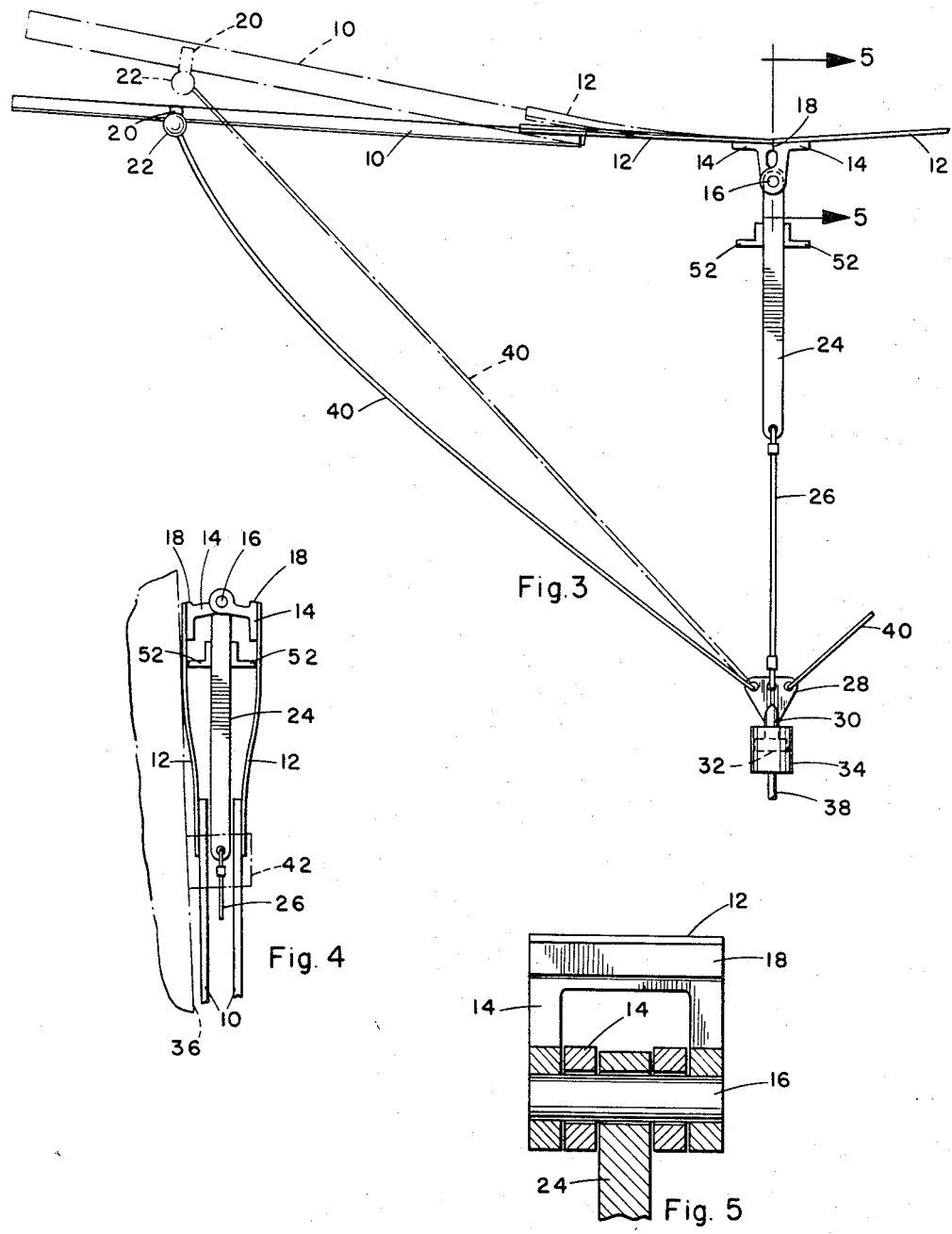

3,401,906
GYROCHUTE
Peter F. Girard, La Mesa, Calif., assignor to The Ryan Aeronautical Co., San Diego, Calif.
Filed May 3, 1966, Ser. No. 547,315
8 Claims. (Cl. 244—138)

ABSTRACT OF THE DISCLOSURE

The gyrochute has a single point of attachment to a payload and is easily stowed with the rotor blades in folded condition. When released, the structure is self-deploying to operating position and autorotates to support the payload, the rotor blades having very simple control means to limit their coning angle and pitch angle in relation to the rotational speed and the load, so providing effective constant speed control for a steady rate of descent.

---

The present invention relates to aerial delivery of cargo and specifically to an autorotating rotor serving as a parachute and hereinafter referred to as a gyrochute.

Parachutes of various types have been used extensively for delivering cargo from aircraft in flight. However, a parachute is expensive, easily damaged when falling on any surface but water or clear ground, and requires considerable time to repack when re-useable. Autorotating rotor devices have also been used, but these usually have complex blade actuating and control mechanisms and are also prone to damage which is not easily repaired in the field.

The primary object of this invention, therefore, is to provide a rotor type gyrochute of extremely simple design, which will deploy itself when air dropped and automatically assume a stable autorotating condition.

Another object of this invention is to provide a gyrochute having a very simple control means for maintaining the rotor at a substantially constant speed, without any special governor or mechanical linkages.

Another object of this invention is to provide a gyrochute which can be mounted on or in almost any type of cargo container, with release means actuated by dropping the cargo in a conventional manner, the gyrochute being attached to the cargo at a single point and requiring no complex harness or mounting structure.

A further object of this invention is to provide a gyrochute which is easily repairable if necessary, yet is so simple and low in cost as to be disposable when conditions make salvaging and re-use impractical.

The gyrochute and its operation are illustrated in the drawings, in which:

FIGURE 3 is a side elevation view of the gyrochute showing the pitch control action;

FIGURE 4 is a side elevaton view of the inner blade structure in folded position; and FIGURE 5 is an enlarged sectional view taken on line 5—5 of FIGURE 3.

Similar characters of reference indicate similar or identical elements and portions throughout the specification and throughout the views of the drawing.

Figure 1:
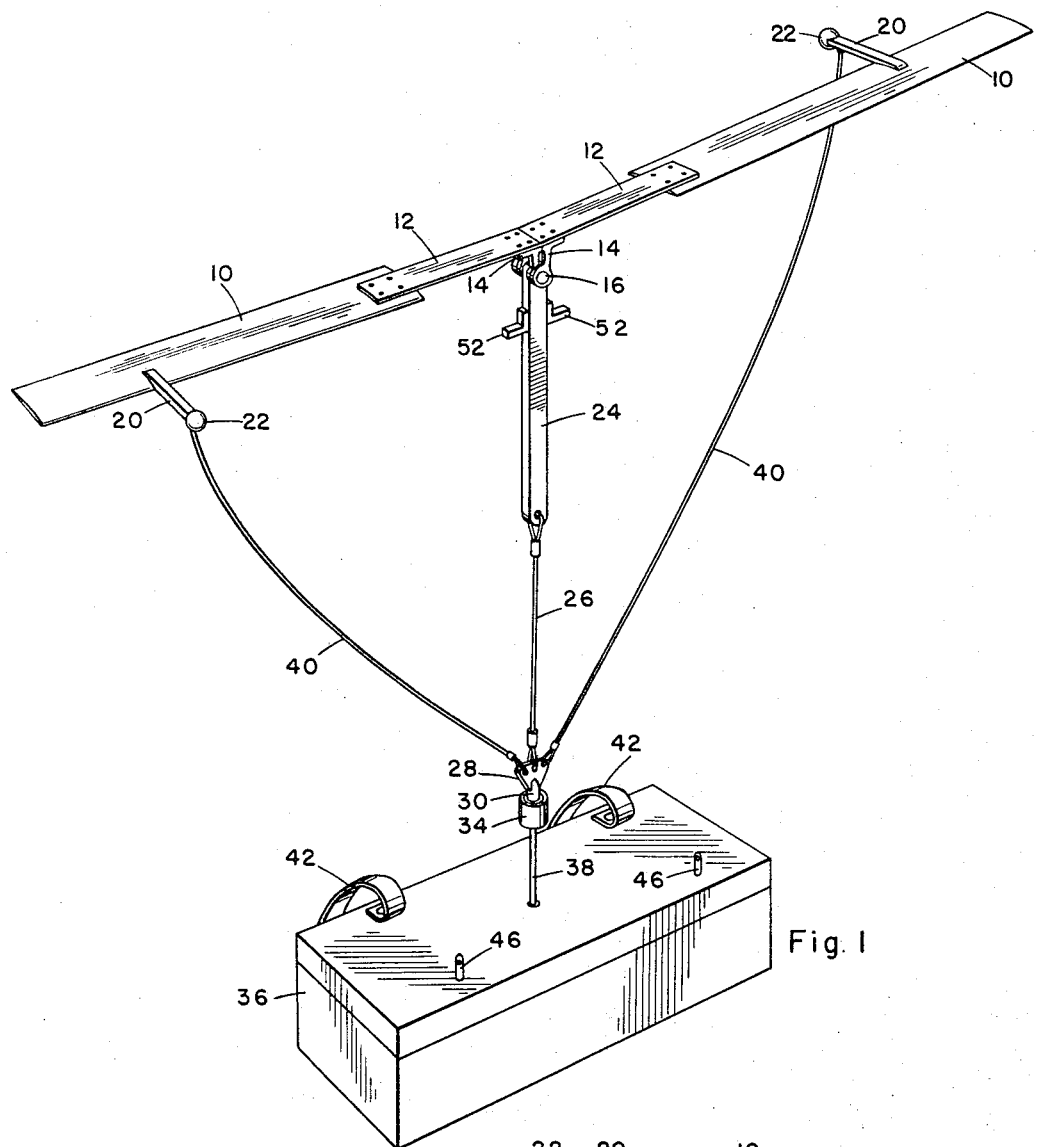
FIGURE 1 is a perspective view of the gyrochute in operating position on a payload container.

The gyrochute is basically an autogiro type rotor functioning as a parachute and is illustrated in its preferred form as having two opposed blades 10, although more blades may be used if desired. Blades 10 are of suitable airfoil shape and are made from wood, plastic, metal, or combinations of such materials, depending on whether the gyrochute is intentionally disposable or is to be re-used.

Fixed to the root end of each blade 10 and extending inwardly is a resilient, flat metal strap 12, the inner end of which is fixed to a hinge yoke 14. Both hinge yokes 14 are pivotal on a common hinge pin 16 having its axis parallel to the general plane of the extended blades and perpendicular to their span, so that the blades can fold downwardly alongside each other. The hinge yokes 14 have stop faces 18 which abut when the blades are extended and limit the upward swing of the blades to the desired extended position. Adjacent the outer end of each blade 10 is a forwardly projecting rod 20 carrying a counterweight 22 to move the effective center of mass of the blade forward, the counterweight being set so that the forces acting thereon during rotation tend to hold the blade at the proper pitch angle for autorotation at the required speed. The principle is well known in the autogiro and helicopter art.

Pivotally attached to hinge pin 16 is an elongated, rigid stem 24 which constitutes a portion of the shaft for the rotor. Connected to the lower end of stem 24 is a flexible support cable 26 comprising a further portion of the rotor shaft, the other end of the cable being secured to a tie plate 28 carried on the rotating portion 30 of a suitable bearing 32. The non-rotating portion 34 of bearing 32 is attached to the payload container 36 by a tie cable 38, which can be fastened in any convenient manner.

From tie plate 28 a control cable 40 extends to each rod 20, the length of each cable being such that, when the blades 10 are at their proper coning angle for the designed rotational speed, the control cables are just slack, as in the full line position in FIGURE 3. If the blades rise above their proper coning angle the control cables 40 will be pulled tight and will restrain the rods 20, imparting a nose or leading edge down position to the blades, as in the broken line position in FIGURE 3. The resilience of straps 12 will allow for all necessary deflections of the blades in operation.

Figure 2:
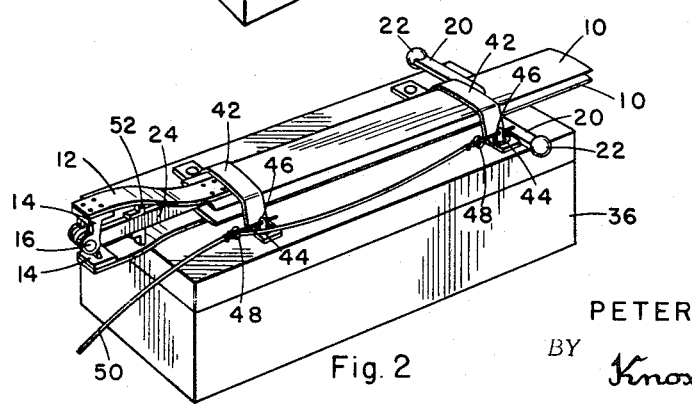
FIGURE 2 is a perspective view of the gyrochute in stowed position on the container.

The gyrochute is stowed by folding the blades 10 on opposite sides of the stem 24, the cables being arranged in any suitable manner to avoid tangling. One method of securing the folded gyrochute to the payload container 36 is shown in FIGURE 2. A pair of tie straps 42, each secured to the container at one end, pass across the blades 10 and have eyelets 44 which fit over posts 46 on the container. Retaining pins 48 pass through the posts 46 above the tie straps to hold the straps in place, the retaining pins being connected to a lanyard or ripcord 50.

To assist in opening the gyrochute when released, bias stops 52 are fixed on opposite sides of stem 24 adjacent the hinge end to hold the straps 12 outwardly and cause bowing in the straps when the blades 10 are held together, as in FIGURES 2 and 4. The gyrochute will open by itself but the spring action of the straps 12 over the bias stops 52 will add to reliability.

When the payload is air dropped the ripcord 50 is pulled in any convenient manner. The released gyrochute will be rapidly pulled from the container by the airflow and the blades 10 will extend until the hinge stop faces 18 meet. After support cable 26 is pulled tight, air drag will cause the blades 10 to cone upwardly causing control cables 40 to pull a high negative pitch angle into the blades. The airflow against the blades will cause the rotor to autorotate at a rapidly increasing rate, slowing down the rate of descent of the container. As the rotational speed increases, centrifugal force on blades 10 will cause a reduction in the coning angle, allowing control cables 40 to slacken and reduce the negative pitch angle of the blades. At a predetermined rotational speed and pitch angle the gyrochute will assume an equilibrium autorotative condition, holding the payload at a safe rate of descent.

The gyrochute can be designed in any convenient size to handle a particular payload at a particular rate of descent. Variations can be made in the load carrying and descent rate characteristics by changing the flyweights 22, or by adjusting the length of control cables 40, to change the blade pitch angle at which the control cables will be slackened and the rotation stabilized.

It is understood that minor variations from the form of the invention disclosed herein may be made without departure from the spirit and scope of the invention, and that the specification and drawings are to be considered as merely illustrative rather than limiting.

I claim:
1. A gyrochute comprising:
   a bearing having means for attachment to a payload; shaft means having a lower end portion freely rotatably connected to said bearing;
   hinge means on the upper end of said shaft means including hinge yokes pivotally mounted to swing about an axis perpendicular to the shaft;
   rotor blades secured to said hinge yokes and being free to swing between a folded position alongside said shaft means and an extended position substantially horizontal when said shaft means is in vertical position;
   and blade restraining elements connected between said shaft means and leading edge portions only of said rotor blades to restrain the leading edge portions of the blades when said rotor blades rise above a predetermined angle with respect to the horizontal.

2. A gyrochute according to claim 1, wherein said rotor blades have resilient inner strap portions coupling the blades to said hinge means.

3. A gyrochute according to claim 1, wherein said restraining elements comprise control cables connected between said shaft means and leading edge portions of said rotor blades, the length of said control cables being such that the cables are just slack when the rotor blades are at a predetermined angle with respect to the horizontal.

4. A gyrochute according to claim 3 and including a rod member fixed to and extending forwardly from each of said rotor blades, with a counterweight on the forward end of each rod member, said control cables being connected to said rod members.

5. A gyrochute according to claim 1, and including resilient strap elements connecting the inner ends of said rotor blades to said hinge means, said shaft means having bias stops thereon to engage said strap elements and cause the strap elements to bow when said rotor blades are held together in folded position.

6. A gyrochute according to claim 1, wherein said hinge yokes have a common hinge pin, said hinge yokes also having stop faces which abut and limit upward motion when said rotor blades are at the extended position.

7. A gyrochute according to claim 1, wherein said shaft means comprises a rigid stem portion to which said hinge means are attached, and a flexible support cable connected between said stem portion and said bearing.

8. A gyrochute according to claim 1 and including a tie plate secured to a rotatable portion of said bearing; said shaft means comprising a rigid stem portion to which said hinge means are attached and a flexible support cable connecting said stem portion to said tie plate;
   said restraining elements comprising fixed length control cables connected from said tie plate to leading edge portions of said rotor blades.

References Cited
UNITED STATES PATENTS

| | | | |
|---|---|---|---|
| 2,044,819 | 6/1936 | Taylor | 244—138 |
| 2,369,048 | 2/1945 | Hays | 170—160.53 |
| 2,440,294 | 4/1948 | Campbell | 244—138 |
| 2,526,451 | 10/1950 | Bensen | 244—138 |

FOREIGN PATENTS

| | | |
|---|---|---|
| 417,635 | 1/1947 | Italy. |

MILTON BUCHLER, Primary Examiner.

R. A. DORNON, Assistant Examiner.